(12) United States Patent
Nohr et al.

(10) Patent No.: US 6,228,157 B1
(45) Date of Patent: May 8, 2001

(54) INK JET INK COMPOSITIONS

(76) Inventors: Ronald S. Nohr, 8955 Nesbit Lakes Dr., Alpharetta, GA (US) 30202; John G. MacDonald, 1472 Knollwood Ter., Decatur, GA (US) 30033

(*) Notice: Subject to any disclaimer, the term of this patent is extended or adjusted under 35 U.S.C. 154(b) by 0 days.

(21) Appl. No.: 09/357,451

(22) Filed: Jul. 20, 1999

Related U.S. Application Data
(60) Provisional application No. 60/093,458, filed on Jul. 20, 1998.

(51) Int. Cl.$^7$ ................................................. C09D 11/02
(52) U.S. Cl. ........................................ 106/31.43; 106/31.75
(58) Field of Search ........................... 106/31.43, 31.75

(56) References Cited

U.S. PATENT DOCUMENTS

| | | |
|---|---|---|
| Re. 28,225 | 11/1974 | Heseltine et al. . |
| Re. 28,789 | 4/1976 | Chang . |
| 575,228 | 1/1897 | von Gallois . |
| 582,853 | 5/1897 | Feer . |
| 893,636 | 7/1908 | Maywald . |
| 1,013,544 | 1/1912 | Fuerth . |
| 1,325,971 | 12/1919 | Akashi . |
| 1,364,406 | 1/1921 | Olsen . |
| 1,436,856 | 11/1922 | Brenizer et al. . |
| 1,744,149 | 1/1930 | Staehlin . |
| 1,803,906 | 5/1931 | Krieger et al. . |
| 1,844,199 | 2/1932 | Bicknell et al. . |
| 1,876,880 | 9/1932 | Drapal . |
| 1,880,572 | 10/1932 | Wendt et al. . |
| 1,880,573 | 10/1932 | Wendt et al. . |
| 1,916,350 | 7/1933 | Wendt et al. . |
| 1,916,779 | 7/1933 | Wendt et al. . |
| 1,955,898 | 4/1934 | Wendt et al. . |
| 1,962,111 | 6/1934 | Bamberger . |
| 2,005,378 | 6/1935 | Kiel . |
| 2,005,511 | 6/1935 | Stoll et al. . |
| 2,049,005 | 7/1936 | Gaspar . |
| 2,054,390 | 9/1936 | Rust et al. . |
| 2,058,489 | 10/1936 | Murch et al. . |
| 2,062,304 | 12/1936 | Gaspar . |

(List continued on next page.)

FOREIGN PATENT DOCUMENTS

| | | |
|---|---|---|
| 103085 | 4/1937 | (AU) . |
| 12624/88 | 9/1988 | (AU) . |
| 620075 | 5/1962 | (BE) . |
| 637169 | 3/1964 | (BE) . |
| 413257 | 10/1932 | (CA) . |
| 458808 | 12/1936 | (CA) . |
| 460268 | 10/1949 | (CA) . |
| 461082 | 11/1949 | (CA) . |
| 463021 | 2/1950 | (CA) . |
| 463022 | 2/1950 | (CA) . |
| 465495 | 5/1950 | (CA) . |
| 465496 | 5/1950 | (CA) . |
| 465499 | 5/1950 | (CA) . |
| 483214 | 5/1952 | (CA) . |
| 517364 | 10/1955 | (CA) . |
| 537687 | 3/1957 | (CA) . |
| 552565 | 2/1958 | (CA) . |
| 571792 | 3/1959 | (CA) . |
| 779239 | 2/1968 | (CA) . |
| 930103 | 7/1973 | (CA) . |
| 2053094 | 4/1992 | (CA) . |
| 603767 | 8/1978 | (CH) . |
| 197808 | 5/1988 | (CH) . |
| 94118 | 5/1958 | (CZ) . |
| 1047787 | 12/1957 | (DE) . |

(List continued on next page.)

OTHER PUBLICATIONS

Patent Abstracts of Japan, JP 56143274 (Canon Inc.) Nov. 7, 1981, abstract.

Patent Abstracts of Japan, JP 63297477 (Fuji Photo Film Co. Ltd.), Dec. 5, 1988, abstract.

Noguchi, H. UV Curable, Aqueous Ink Jet Ink: Material Design and Performance for Digital Printing 1998 International Conf. on Digital Printing Technologies 107–110 1998, no month available.

ESP@CENET databse JP 10324836 (Omron Corp.), Dec. 8, 1998. abstract.

Derwent World Patents Index JP 8002092 (Mitsubishi Paper Mills Ltd.) Jan. 9, 1996. abstract. no month available.

Kubat et al. "Photophysical properties of metal complexes of meso–tetrakis (40sulphonatophenyl) porphyrin," *J. Photochem. and Photobiol.* 9 6 93–97 1996, no month available.

Derwent World Patents Index EP 659039 (Canon KK) Jun. 21, 1995. abstract.

Derwent World Patents Index JP 7061114 (Dainippon Printing Co. Ltd.) Mar. 7, 1995. abstract.

Abstract for WO 95/00343—A1 *Textiles: Paper: Cellulose* p. 7 1995, no month available.

Maki, Y. et al. "A novel heterocyclic N–oxide, pyrimido[5, 4–g]pteridinetetrone 5–oxide, with multifunctional photo-oxidative properties" *Chemical Abstracts* 122 925 [No. 122:31350F] 1995, no month available.

(List continued on next page.)

*Primary Examiner*—Helene Klemanski
(74) *Attorney, Agent, or Firm*—Kilpatrick Stockton LLP

(57) ABSTRACT

The present invention is directed to compositions containing a colorant and at least one water-soluble solvent, wherein the water-soluble solvent is a compound having the following general formula:

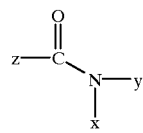

wherein x is hydrogen or an alkyl having from 1 to 6 carbons; y is an alkyl having from 1 to 6 carbons; and z is an alkyl having from 1 to 6 carbons.

17 Claims, No Drawings

U.S. PATENT DOCUMENTS

| | | |
|---|---|---|
| 2,090,511 | 8/1937 | Crossley et al. . |
| 2,097,119 | 10/1937 | Eggert . |
| 2,106,539 | 1/1938 | Schnitzspahn . |
| 2,111,692 | 3/1938 | Saunders et al. . |
| 2,125,015 | 7/1938 | Gaspar . |
| 2,130,572 | 9/1938 | Wendt . |
| 2,132,154 | 10/1938 | Gaspar . |
| 2,145,960 | 2/1939 | Wheatley et al. . |
| 2,154,996 | 4/1939 | Rawling . |
| 2,159,280 | 5/1939 | Mannes et al. . |
| 2,171,976 | 9/1939 | Erickson . |
| 2,181,800 | 11/1939 | Crossley et al. . |
| 2,185,153 | 12/1939 | Lecher et al. . |
| 2,220,178 | 11/1940 | Schneider . |
| 2,230,590 | 2/1941 | Eggert et al. . |
| 2,237,885 | 4/1941 | Markush et al. . |
| 2,243,630 | 5/1941 | Houk et al. . |
| 2,268,324 | 12/1941 | Polgar . |
| 2,281,895 | 5/1942 | van Poser et al. . |
| 2,328,166 | 8/1943 | Poigar et al. . |
| 2,346,090 | 4/1944 | Staehle . |
| 2,349,090 | 5/1944 | Haddock . |
| 2,356,618 | 8/1944 | Rossander et al. . |
| 2,361,301 | 10/1944 | Libby, Jr. et al. . |
| 2,364,359 | 12/1944 | Kienle et al. . |
| 2,381,145 | 8/1945 | von Glahn et al. . |
| 2,382,904 | 8/1945 | Federsen . |
| 2,386,646 | 10/1945 | Adams et al. . |
| 2,402,106 | 6/1946 | von Glahn et al. . |
| 2,416,145 | 2/1947 | Biro . |
| 2,477,165 | 7/1949 | Bergstrom . |
| 2,527,347 | 10/1950 | Bergstrom . |
| 2,580,461 | 1/1952 | Pearl . |
| 2,601,669 | 6/1952 | Tullsen . |
| 2,612,494 | 9/1952 | von Glahn et al. . |
| 2,612,495 | 9/1952 | von Glahn et al. . |
| 2,628,959 | 2/1953 | von Glahn et al. . |
| 2,647,080 | 7/1953 | Joyce . |
| 2,680,685 | 6/1954 | Ratchford . |
| 2,728,784 | 12/1955 | Tholstrup et al. . |
| 2,732,301 | 1/1956 | Robertson et al. . |
| 2,744,103 | 5/1956 | Koch . |
| 2,757,090 | 7/1956 | Meugebauer et al. . |
| 2,763,550 | 9/1956 | Lovick . |
| 2,768,171 | 10/1956 | Clarke et al. . |
| 2,773,056 | 12/1956 | Helfaer . |
| 2,798,000 | 7/1957 | Monterman . |
| 2,809,189 | 10/1957 | Stanley et al. . |
| 2,827,358 | 3/1958 | Kaplan et al. . |
| 2,834,773 | 5/1958 | Scalera et al. . |
| 2,875,045 | 2/1959 | Lurie . |
| 2,892,865 | 6/1959 | Giraldi et al. . |
| 2,897,187 | 7/1959 | Koch . |
| 2,936,241 | 5/1960 | Sharp et al. . |
| 2,940,853 | 6/1960 | Sagura et al. . |
| 2,955,067 | 10/1960 | McBurney et al. . |
| 2,992,129 | 7/1961 | Gauthier . |
| 2,992,198 | 7/1961 | Funahashi . |
| 3,030,208 | 4/1962 | Schellenberg et al. . |
| 3,071,815 | 1/1963 | MacKinnon . |
| 3,075,014 | 1/1963 | Palopoli et al. . |
| 3,076,813 | 2/1963 | Sharp . |
| 3,104,973 | 9/1963 | Sprague et al. . |
| 3,114,634 | 12/1963 | Brown et al. . |
| 3,121,632 | 2/1964 | Sprague et al. . |
| 3,123,647 | 3/1964 | Duennenberger et al. . |
| 3,133,049 | 5/1964 | Hertel et al. . |
| 3,140,949 | 7/1964 | Sprague et al. . |
| 3,154,416 | 10/1964 | Fidelman . |
| 3,155,509 | 11/1964 | Roscow . |
| 3,175,905 | 3/1965 | Wiesbaden . |
| 3,178,285 | 4/1965 | Anderau et al. . |
| 3,238,163 | 3/1966 | O'Neill . |
| 3,242,215 | 3/1966 | Heitmiller . |
| 3,248,337 | 4/1966 | Zirker et al. . |
| 3,266,973 | 8/1966 | Crowley . |
| 3,282,886 | 11/1966 | Gadecki . |
| 3,284,205 | 11/1966 | Sprague et al. . |
| 3,300,314 | 1/1967 | Rauner et al. . |
| 3,304,297 | 2/1967 | Wegmann et al. . |
| 3,305,361 | 2/1967 | Gaynor et al. . |
| 3,313,797 | 4/1967 | Kissa . |
| 3,320,080 | 5/1967 | Mazzarella et al. . |
| 3,330,659 | 7/1967 | Wainer . |
| 3,341,492 | 9/1967 | Champ et al. . |
| 3,359,109 | 12/1967 | Harder et al. . |
| 3,361,827 | 1/1968 | Biletch . |
| 3,363,969 | 1/1968 | Brooks . |
| 3,385,700 | 5/1968 | Willems et al. . |
| 3,397,984 | 8/1968 | Williams et al. . |
| 3,415,875 | 12/1968 | Luethi et al. . |
| 3,418,118 | 12/1968 | Thommes et al. . |
| 3,445,234 | 5/1969 | Cescon et al. . |
| 3,453,258 | 7/1969 | Parmerter et al. . |
| 3,453,259 | 7/1969 | Parmerter et al. . |
| 3,464,841 | 9/1969 | Skofronick . |
| 3,467,647 | 9/1969 | Benninga . |
| 3,479,185 | 11/1969 | Chambers . |
| 3,502,476 | 3/1970 | Kohei et al. . |
| 3,503,744 | 3/1970 | Itano et al. . |
| 3,514,597 | 5/1970 | Haes et al. . |
| 3,541,142 | 11/1970 | Cragoe, Jr. . |
| 3,546,161 | 12/1970 | Wolheim . |
| 3,547,646 | 12/1970 | Hori et al. . |
| 3,549,367 | 12/1970 | Chang et al. . |
| 3,553,710 | 1/1971 | Lloyd et al. . |
| 3,563,931 | 2/1971 | Horiguchi . |
| 3,565,753 | 2/1971 | Yurkowitz . |
| 3,574,624 | 4/1971 | Reynolds et al. . |
| 3,579,533 | 5/1971 | Yalman . |
| 3,595,655 | 7/1971 | Robinson et al. . |
| 3,595,657 | 7/1971 | Robinson et al. . |
| 3,595,658 | 7/1971 | Gerlach et al. . |
| 3,595,659 | 7/1971 | Gerlach et al. . |
| 3,607,639 | 9/1971 | Krefeld et al. . |
| 3,607,693 | 9/1971 | Heine et al. . |
| 3,607,863 | 9/1971 | Dosch . |
| 3,615,562 | 10/1971 | Harrison et al. . |
| 3,617,288 | 11/1971 | Hartman et al. . |
| 3,617,335 | 11/1971 | Kumura et al. . |
| 3,619,238 | 11/1971 | Kimura et al. . |
| 3,619,239 | 11/1971 | Osada et al. . |
| 3,637,337 | 1/1972 | Pilling . |
| 3,637,581 | 1/1972 | Horioguchi et al. . |
| 3,642,472 | 2/1972 | Mayo . |
| 3,647,467 | 3/1972 | Grubb . |
| 3,652,275 | 3/1972 | Baum et al. . |
| 3,660,542 | 5/1972 | Adachi et al. . |
| 3,667,954 | 6/1972 | Itano et al. . |
| 3,668,188 | 6/1972 | King et al. . |
| 3,669,925 | 6/1972 | King et al. . |
| 3,671,096 | 6/1972 | Mackin . |
| 3,671,251 | 6/1972 | Houle et al. . |
| 3,676,690 | 7/1972 | McMillin et al. . |
| 3,678,044 | 7/1972 | Adams . |
| 3,689,565 | 9/1972 | Hoffmann et al. . |
| 3,694,241 | 9/1972 | Guthrie et al. . |
| 3,695,879 | 10/1972 | Laming et al. . |
| 3,697,280 | 10/1972 | Strilko . |
| 3,705,043 | 12/1972 | Zablak . |
| 3,707,371 | 12/1972 | Files . |

| | | | | | |
|---|---|---|---|---|---|
| 3,729,313 | 4/1973 | Smith . | 4,229,172 | 10/1980 | Baumann et al. . |
| 3,737,628 | 6/1973 | Azure . | 4,232,106 | 11/1980 | Iwasaki et al. . |
| 3,765,896 | 10/1973 | Fox . | 4,238,492 | 12/1980 | Majoie . |
| 3,775,130 | 11/1973 | Enomoto et al. . | 4,239,843 | 12/1980 | Hara et al. . |
| 3,788,849 | 1/1974 | Taguchi et al. . | 4,239,850 | 12/1980 | Kita et al. . |
| 3,799,773 | 3/1974 | Watarai et al. . | 4,241,155 | 12/1980 | Hara et al. . |
| 3,800,439 | 4/1974 | Sokoloski et al. . | 4,242,430 | 12/1980 | Hara et al. . |
| 3,801,329 | 4/1974 | Sandner et al. . | 4,242,431 | 12/1980 | Hara et al. . |
| 3,817,752 | 6/1974 | Laridon et al. . | 4,245,018 | 1/1981 | Hara et al. . |
| 3,840,338 | 10/1974 | Zviak et al. . | 4,245,033 | 1/1981 | Eida et al. . |
| 3,844,790 | 10/1974 | Chang et al. . | 4,245,995 | 1/1981 | Hugl et al. . |
| 3,870,524 | 3/1975 | Watanabe et al. . | 4,246,330 | 1/1981 | Hara et al. . |
| 3,873,500 | 3/1975 | Kato et al. . | 4,248,949 | 2/1981 | Hara et al. . |
| 3,876,496 | 4/1975 | Lozano . | 4,250,096 | 2/1981 | Kvita et al. . |
| 3,887,450 | 6/1975 | Gilano et al. . | 4,251,622 | 2/1981 | Kimoto et al. . |
| 3,895,949 | 7/1975 | Akamatsu . | 4,251,662 | 2/1981 | Ozawa et al. . |
| 3,901,779 | 8/1975 | Mani . | 4,254,195 | 3/1981 | Hara et al. . |
| 3,904,562 | 9/1975 | Hopfenberg et al. . | 4,256,493 | 3/1981 | Yokoyama et al. . |
| 3,910,993 | 10/1975 | Avar et al. . | 4,256,817 | 3/1981 | Hara et al. . |
| 3,914,165 | 10/1975 | Gaske . | 4,258,123 | 3/1981 | Nagashima et al. . |
| 3,914,166 | 10/1975 | Rudolph et al. . | 4,258,367 | 3/1981 | Mansukhani . |
| 3,915,824 | 10/1975 | McGinniss . | 4,259,432 | 3/1981 | Kondoh et al. . |
| 3,919,323 | 11/1975 | Houlihan et al. . | 4,262,936 | 4/1981 | Miyamoto . |
| 3,926,641 | 12/1975 | Rosen . | 4,268,605 | 5/1981 | Hara et al. . |
| 3,928,264 | 12/1975 | Young, Jr. et al. . | 4,268,667 | 5/1981 | Anderson . |
| 3,931,021 * | 1/1976 | Lundberg ................................ 252/32 | 4,269,926 | 5/1981 | Hara et al. . |
| 3,933,682 | 1/1976 | Bean . | 4,270,130 | 5/1981 | Houle et al. . |
| 3,952,129 | 4/1976 | Matsukawa et al. . | 4,271,252 | 6/1981 | Hara et al. . |
| 3,954,648 * | 5/1976 | Belcak et al. ........................ 252/153 | 4,271,253 | 6/1981 | Hara et al. . |
| 3,960,685 | 6/1976 | Sano et al. . | 4,272,244 | 6/1981 | Schlick . |
| 3,965,157 | 6/1976 | Harrison . | 4,276,211 | 6/1981 | Singer et al. . |
| 3,978,132 | 8/1976 | Houlihan et al. . | 4,277,497 | 7/1981 | Fromantin . |
| 3,984,248 | 10/1976 | Sturmer . | 4,279,653 | 7/1981 | Makishima et al. . |
| 3,988,154 | 10/1976 | Sturmer . | 4,279,982 | 7/1981 | Iwasaki et al. . |
| 4,004,998 | 1/1977 | Rosen . | 4,279,985 | 7/1981 | Nonogaki et al. . |
| 4,012,256 | 3/1977 | Levinos . | 4,284,485 | 8/1981 | Berner . |
| 4,017,652 | 4/1977 | Gruber . | 4,288,631 | 9/1981 | Ching . |
| 4,022,674 | 5/1977 | Rosen . | 4,289,844 | 9/1981 | Specht et al. . |
| 4,024,324 | 5/1977 | Sparks . | 4,290,870 | 9/1981 | Kondoh et al. . |
| 4,039,332 | 8/1977 | Kokelenberg et al. . | 4,293,458 | 10/1981 | Gruenberger et al. . |
| 4,043,819 | 8/1977 | Baumann . | 4,298,679 | 11/1981 | Shinozaki et al. . |
| 4,043,829 * | 8/1977 | Ratledge et al. ..................... 106/271 | 4,300,123 | 11/1981 | McMillan et al. . |
| 4,048,034 | 9/1977 | Martan . | 4,301,223 | 11/1981 | Nakamura et al. . |
| 4,054,719 | 10/1977 | Cordes, III . | 4,302,606 | 11/1981 | Barabas et al. . |
| 4,056,665 | 11/1977 | Tayler et al. . | 4,306,014 | 12/1981 | Kunikane et al. . |
| 4,058,400 | 11/1977 | Crivello . | 4,307,182 | 12/1981 | Dalzell et al. . |
| 4,067,892 | 1/1978 | Thorne et al. . | 4,308,400 | 12/1981 | Felder et al. . |
| 4,071,424 | 1/1978 | Dart et al. . | 4,315,807 | 2/1982 | Felder et al. . |
| 4,073,968 | 2/1978 | Miyamoto et al. . | 4,318,705 | 3/1982 | Nowak et al. . |
| 4,077,769 | 3/1978 | Garcia . | 4,318,791 | 3/1982 | Felder et al. . |
| 4,079,183 | 3/1978 | Green . | 4,321,118 | 3/1982 | Felder et al. . |
| 4,085,062 | 4/1978 | Virgilio et al. . | 4,335,054 | 6/1982 | Blaser et al. . |
| 4,090,877 | 5/1978 | Streeper . | 4,335,055 | 6/1982 | Blaser et al. . |
| 4,100,047 | 7/1978 | McCarty . | 4,336,323 | 6/1982 | Winslow . |
| 4,105,572 | 8/1978 | Gorondy . | 4,343,891 | 8/1982 | Aasen et al. . |
| 4,107,733 | 8/1978 | Schickedanz . | 4,345,011 | 8/1982 | Drexhage . |
| 4,110,112 | 8/1978 | Roman et al. . | 4,347,111 | 8/1982 | Gehlhaus et al. . |
| 4,111,699 | 9/1978 | Krueger . | 4,349,617 | 9/1982 | Kawashiri et al. . |
| 4,114,028 | 9/1978 | Baio et al. . | 4,350,753 | 9/1982 | Shelnut et al. . |
| 4,126,412 | 11/1978 | Masson et al. . | 4,351,893 | 9/1982 | Anderson . |
| 4,132,562 | 1/1979 | Burke, Jr. et al. . | 4,356,255 | 10/1982 | Tachikawa et al. . |
| 4,141,807 | 2/1979 | Via . | 4,357,468 | 11/1982 | Szejtli et al. . |
| 4,144,156 | 3/1979 | Kuesters et al. . | 4,359,524 | 11/1982 | Masuda et al. . |
| 4,148,658 | 4/1979 | Kondoh et al. . | 4,362,806 | 12/1982 | Whitmore . |
| 4,162,162 | 7/1979 | Dueber . | 4,367,072 | 1/1983 | Vogtle et al. . |
| 4,171,977 | 10/1979 | Hasegawa et al. . | 4,367,280 | 1/1983 | Kondo et al. . |
| 4,179,577 | 12/1979 | Green . | 4,369,283 | 1/1983 | Altschuler . |
| 4,181,807 | 1/1980 | Green . | 4,370,401 | 1/1983 | Winslow et al. . |
| 4,190,671 | 2/1980 | Vanstone et al. . | 4,372,582 | 2/1983 | Geisler . |
| 4,197,080 | 4/1980 | Mee . | 4,373,017 | 2/1983 | Masukawa et al. . |
| 4,199,420 | 4/1980 | Photis . | 4,373,020 | 2/1983 | Winslow . |

| | | |
|---|---|---|
| 4,374,984 | 2/1983 | Eichler et al. . |
| 4,376,887 | 3/1983 | Greenaway et al. . |
| 4,383,835 | 5/1983 | Preuss et al. . |
| 4,390,616 | 6/1983 | Sato et al. . |
| 4,391,867 | 7/1983 | Derick et al. . |
| 4,399,209 | 8/1983 | Sanders et al. . |
| 4,400,173 | 8/1983 | Beavan . |
| 4,401,470 | 8/1983 | Bridger . |
| 4,416,961 | 11/1983 | Drexhage . |
| 4,421,559 | 12/1983 | Owatari . |
| 4,424,325 | 1/1984 | Tsunoda et al. . |
| 4,425,162 | 1/1984 | Sugiyama . |
| 4,425,424 | 1/1984 | Altland et al. . |
| 4,426,153 | 1/1984 | Libby et al. . |
| 4,434,035 | 2/1984 | Eichler et al. . |
| 4,440,827 | 4/1984 | Miyamoto et al. . |
| 4,447,521 | 5/1984 | Tiers et al. . |
| 4,450,227 | 5/1984 | Holmes et al. . |
| 4,460,676 | 7/1984 | Fabel . |
| 4,467,112 | 8/1984 | Matsuura et al. . |
| 4,475,999 | 10/1984 | Via . |
| 4,477,681 | 10/1984 | Gehlhaus et al. . |
| 4,489,334 | 12/1984 | Owatari . |
| 4,495,041 | 1/1985 | Goldstein . |
| 4,496,447 | 1/1985 | Eichler et al. . |
| 4,500,355 | 2/1985 | Shimada et al. . |
| 4,508,570 | 4/1985 | Fugii et al. . |
| 4,510,392 | 4/1985 | Litt et al. . |
| 4,523,924 | 6/1985 | Lacroix . |
| 4,524,122 | 6/1985 | Weber et al. . |
| 4,534,838 | 8/1985 | Lin et al. . |
| 4,548,896 | 10/1985 | Sabongi et al. . |
| 4,555,474 | 11/1985 | Kawamura . |
| 4,557,730 | 12/1985 | Bennett et al. . |
| 4,564,560 | 1/1986 | Tani et al. . |
| 4,565,769 | 1/1986 | Dueber et al. . |
| 4,567,171 | 1/1986 | Mangum . |
| 4,571,377 | 2/1986 | McGinniss et al. . |
| 4,595,745 | 6/1986 | Nakano et al. . |
| 4,604,344 | 8/1986 | Irving et al. . |
| 4,605,442 | 8/1986 | Kawashita et al. . |
| 4,613,334 | 9/1986 | Thomas et al. . |
| 4,614,723 | 9/1986 | Schmidt et al. . |
| 4,617,380 | 10/1986 | Hinson et al. . |
| 4,620,875 | 11/1986 | Shimada et al. . |
| 4,620,876 | 11/1986 | Fugii et al. . |
| 4,622,286 | 11/1986 | Sheets . |
| 4,631,085 | 12/1986 | Kawanishi et al. . |
| 4,632,891 | 12/1986 | Banks et al. . |
| 4,632,895 | 12/1986 | Patel et al. . |
| 4,634,644 | 1/1987 | Irving et al. . |
| 4,638,340 | 1/1987 | Iiyama et al. . |
| 4,647,310 | 3/1987 | Shimada et al. . |
| 4,655,783 | 4/1987 | Reinert et al. . |
| 4,663,275 | 5/1987 | West et al. . |
| 4,663,641 | 5/1987 | Iiyama et al. . |
| 4,668,533 | 5/1987 | Miller . |
| 4,672,041 | 6/1987 | Jain . |
| 4,698,291 | 10/1987 | Koibuchi et al. . |
| 4,701,402 | 10/1987 | Patel et al. . |
| 4,702,996 | 10/1987 | Griffing et al. . |
| 4,704,133 | 11/1987 | Reinert et al. . |
| 4,707,161 | 11/1987 | Thomas et al. . |
| 4,707,425 | 11/1987 | Sasagawa et al. . |
| 4,707,430 | 11/1987 | Ozawa et al. . |
| 4,711,668 | 12/1987 | Shimada et al. . |
| 4,711,802 | 12/1987 | Tannenbaum . |
| 4,713,113 | 12/1987 | Shimada et al. . |
| 4,720,450 | 1/1988 | Ellis . |
| 4,721,531 | 1/1988 | Wildeman et al. . |
| 4,721,734 | 1/1988 | Gehlhaus et al. . |
| 4,724,021 | 2/1988 | Martin et al. . |
| 4,724,201 | 2/1988 | Okazaki et al. . |
| 4,725,527 | 2/1988 | Robillard . |
| 4,727,824 | 3/1988 | Ducharme et al. . |
| 4,732,615 | 3/1988 | Kawashita et al. . |
| 4,737,190 | 4/1988 | Shimada et al. . |
| 4,737,438 | 4/1988 | Ito et al. . |
| 4,740,451 | 4/1988 | Kohara . |
| 4,745,042 | 5/1988 | Sasago et al. . |
| 4,746,735 | 5/1988 | Kruper, Jr. et al. . |
| 4,752,341 | 6/1988 | Rock . |
| 4,755,450 | 7/1988 | Sanders et al. . |
| 4,761,181 | 8/1988 | Suzuki . |
| 4,766,050 | 8/1988 | Jerry . |
| 4,766,055 | 8/1988 | Kawabata et al. . |
| 4,770,667 | 9/1988 | Evans et al. . |
| 4,772,291 | 9/1988 | Shibanai et al. . |
| 4,772,541 | 9/1988 | Gottschalk . |
| 4,775,386 | 10/1988 | Reinert et al. . |
| 4,786,586 | 11/1988 | Lee et al. . |
| 4,789,382 | 12/1988 | Neumann et al. . |
| 4,790,565 | 12/1988 | Steed . |
| 4,800,149 | 1/1989 | Gottschalk . |
| 4,803,008 | 2/1989 | Ciolino et al. . |
| 4,808,189 | 2/1989 | Oishi et al. . |
| 4,812,139 | 3/1989 | Brodmann . |
| 4,812,517 | 3/1989 | West . |
| 4,813,970 | 3/1989 | Kirjanov et al. . |
| 4,822,714 | 4/1989 | Sanders . |
| 4,831,068 | 5/1989 | Reinert et al. . |
| 4,834,771 | 5/1989 | Yamauchi et al. . |
| 4,837,106 | 6/1989 | Ishikawa et al. . |
| 4,837,331 | 6/1989 | Yamanishi et al. . |
| 4,838,938 | 6/1989 | Tomida et al. . |
| 4,839,269 | 6/1989 | Okazaki et al. . |
| 4,849,320 | 7/1989 | Irving et al. . |
| 4,853,037 | 8/1989 | Johnson et al. . |
| 4,853,398 | 8/1989 | Carr et al. . |
| 4,854,971 | 8/1989 | Gane et al. . |
| 4,857,438 | 8/1989 | Loerzer et al. . |
| 4,861,916 | 8/1989 | Kohler et al. . |
| 4,865,942 | 9/1989 | Gottschalk et al. . |
| 4,874,391 | 10/1989 | Reinert . |
| 4,874,899 | 10/1989 | Hoelderich et al. . |
| 4,885,395 | 12/1989 | Hoelderich . |
| 4,886,774 | 12/1989 | Doi . |
| 4,892,941 | 1/1990 | Dolphin et al. . |
| 4,895,880 | 1/1990 | Gottschalk . |
| 4,900,581 | 2/1990 | Stuke et al. . |
| 4,902,299 | 2/1990 | Anton . |
| 4,902,725 | 2/1990 | Moore . |
| 4,902,787 | 2/1990 | Freeman . |
| 4,911,732 | 3/1990 | Neumann et al. . |
| 4,911,899 | 3/1990 | Hagiwara et al. . |
| 4,917,956 | 4/1990 | Rohrbach . |
| 4,921,317 | 5/1990 | Suzuki et al. . |
| 4,925,770 | 5/1990 | Ichiura et al. . |
| 4,925,777 | 5/1990 | Inoue et al. . |
| 4,926,190 | 5/1990 | Lavar . |
| 4,933,265 | 6/1990 | Inoue et al. . |
| 4,933,948 | 6/1990 | Herkstroeter . |
| 4,937,161 | 6/1990 | Kita et al. . |
| 4,942,113 | 7/1990 | Trundle . |
| 4,944,988 | 7/1990 | Yasuda et al. . |
| 4,950,304 | 8/1990 | Reinert et al. . |
| 4,952,478 | 8/1990 | Miyagawa et al. . |
| 4,952,680 | 8/1990 | Schmeidl . |
| 4,954,380 | 9/1990 | Kanome et al. . |
| 4,954,416 | 9/1990 | Wright et al. . |
| 4,956,254 | 9/1990 | Washizu et al. . |
| 4,964,871 | 10/1990 | Reinert et al. . |

| | | |
|---|---|---|
| 4,965,294 | 10/1990 | Ohngemach et al. . |
| 4,966,607 | 10/1990 | Shinoki et al. . |
| 4,966,833 | 10/1990 | Inoue . |
| 4,968,596 | 11/1990 | Inoue et al. . |
| 4,968,813 | 11/1990 | Rule et al. . |
| 4,985,345 | 1/1991 | Hayakawa et al. . |
| 4,987,056 | 1/1991 | Imahashi et al. . |
| 4,988,561 | 1/1991 | Wason . |
| 4,997,745 | 3/1991 | Kawamura et al. . |
| 5,001,330 | 3/1991 | Koch . |
| 5,002,853 | 3/1991 | Aoai et al. . |
| 5,002,993 | 3/1991 | West et al. . |
| 5,003,142 | 3/1991 | Fuller . |
| 5,006,758 | 4/1991 | Gellert et al. . |
| 5,013,959 | 5/1991 | Kogelschatz . |
| 5,017,195 | 5/1991 | Satou et al. . |
| 5,023,129 | 6/1991 | Morganti et al. . |
| 5,025,036 | 6/1991 | Carson et al. . |
| 5,026,425 | 6/1991 | Hindagolla et al. . |
| 5,026,427 | 6/1991 | Mitchell et al. . |
| 5,028,262 | 7/1991 | Barlow, Jr. et al. . |
| 5,028,792 | 7/1991 | Mullis . |
| 5,030,243 | 7/1991 | Reinert . |
| 5,030,248 | 7/1991 | Meszaros . |
| 5,034,526 | 7/1991 | Bonham et al. . |
| 5,037,726 | 8/1991 | Kojima et al. . |
| 5,045,435 | 9/1991 | Adams et al. . |
| 5,045,573 | 9/1991 | Kohler et al. . |
| 5,047,556 | 9/1991 | Kohler et al. . |
| 5,049,777 | 9/1991 | Mechtersheimer . |
| 5,053,320 | 10/1991 | Robbillard . |
| 5,055,579 | 10/1991 | Pawlowski et al. . |
| 5,057,562 | 10/1991 | Reinert . |
| 5,068,140 | 11/1991 | Malhotra et al. . |
| 5,068,364 | 11/1991 | Takagaki et al. . |
| 5,069,681 | 12/1991 | Bouwknegt et al. . |
| 5,070,001 | 12/1991 | Stahlhofen . |
| 5,073,448 | 12/1991 | Vieira et al. . |
| 5,074,885 | 12/1991 | Reinert . |
| 5,076,808 | 12/1991 | Hahn et al. . |
| 5,085,698 | 2/1992 | Ma et al. . |
| 5,087,550 | 2/1992 | Blum et al. . |
| 5,089,050 | 2/1992 | Vieira et al. . |
| 5,089,374 | 2/1992 | Saeva . |
| 5,096,456 | 3/1992 | Reinert et al. . |
| 5,096,489 | 3/1992 | Laver . |
| 5,096,781 | 3/1992 | Vieira et al. . |
| 5,098,477 | 3/1992 | Vieira et al. . |
| 5,098,793 | 3/1992 | Rohrbach et al. . |
| 5,098,806 | 3/1992 | Robillard . |
| 5,106,723 | 4/1992 | West et al. . |
| 5,108,505 | 4/1992 | Moffat . |
| 5,108,874 | 4/1992 | Griffing et al. . |
| 5,110,706 | 5/1992 | Yumoto et al. . |
| 5,110,709 | 5/1992 | Aoai et al. . |
| 5,114,832 | 5/1992 | Zertani et al. . |
| 5,124,723 | 6/1992 | Laver . |
| 5,130,227 | 7/1992 | Wade et al. . |
| 5,133,803 | 7/1992 | Moffatt . |
| 5,135,940 | 8/1992 | Belander et al. . |
| 5,139,572 | 8/1992 | Kawashima . |
| 5,139,687 | 8/1992 | Borgher, Sr. et al. . |
| 5,141,556 | 8/1992 | Matrick . |
| 5,141,797 | 8/1992 | Wheeler . |
| 5,144,964 | 9/1992 | Demian . |
| 5,147,901 | 9/1992 | Rutsch et al. . |
| 5,153,104 | 10/1992 | Rossman et al. . |
| 5,153,105 | 10/1992 | Sher et al. . |
| 5,153,166 | 10/1992 | Jain et al. . |
| 5,160,346 | 11/1992 | Fuso et al. . |
| 5,160,372 | 11/1992 | Matrick . |
| 5,166,041 | 11/1992 | Murofushi et al. . |
| 5,169,436 | 12/1992 | Matrick . |
| 5,169,438 | 12/1992 | Matrick . |
| 5,173,112 | 12/1992 | Matrick et al. ............... 106/31.43 |
| 5,176,984 | 1/1993 | Hipps, Sr. et al. . |
| 5,178,420 | 1/1993 | Shelby . |
| 5,180,425 | 1/1993 | Matrick et al. . |
| 5,180,624 | 1/1993 | Kojima et al. . |
| 5,180,652 | 1/1993 | Yamaguchi et al. . |
| 5,181,935 | 1/1993 | Reinert et al. . |
| 5,185,236 | 2/1993 | Shiba et al. . |
| 5,187,045 | 2/1993 | Bonham et al. . |
| 5,187,049 | 2/1993 | Sher et al. . |
| 5,190,565 | 3/1993 | Berenbaum et al. . |
| 5,190,710 | 3/1993 | Kletecka . |
| 5,190,845 | 3/1993 | Hashimoto et al. . |
| 5,193,854 | 3/1993 | Borowski, Jr. et al. . |
| 5,196,295 | 3/1993 | Davis . |
| 5,197,991 | 3/1993 | Rembold . |
| 5,198,330 | 3/1993 | Martic et al. . |
| 5,202,209 | 4/1993 | Winnick et al. . |
| 5,202,210 | 4/1993 | Matsuoka et al. . |
| 5,202,211 | 4/1993 | Vercoulen . |
| 5,202,212 | 4/1993 | Shin et al. . |
| 5,202,213 | 4/1993 | Nakahara et al. . |
| 5,202,215 | 4/1993 | Kanakura et al. . |
| 5,202,221 | 4/1993 | Imai et al. . |
| 5,205,861 | 4/1993 | Matrick . |
| 5,208,136 | 5/1993 | Zanoni et al. . |
| 5,209,814 | 5/1993 | Felten et al. . |
| 5,219,703 | 6/1993 | Bugner et al. . |
| 5,221,334 | 6/1993 | Ma et al. . |
| 5,224,197 | 6/1993 | Zanoni et al. . |
| 5,224,987 | 7/1993 | Matrick . |
| 5,226,957 | 7/1993 | Wickramanayake et al. . |
| 5,227,022 | 7/1993 | Leonhardt et al. . |
| 5,230,982 | 7/1993 | Davis et al. . |
| 5,241,059 | 8/1993 | Yoshinaga . |
| 5,244,476 | 9/1993 | Schultz et al. . |
| 5,250,109 | 10/1993 | Chan et al. . |
| 5,254,429 | 10/1993 | Gracia et al. . |
| 5,256,193 | 10/1993 | Winnik et al. . |
| 5,258,274 | 11/1993 | Helland et al. . |
| 5,261,953 | 11/1993 | Vieira et al. . |
| 5,262,276 | 11/1993 | Kawamura . |
| 5,268,027 | 12/1993 | Chan et al. . |
| 5,270,078 | 12/1993 | Walker et al. . |
| 5,271,764 | 12/1993 | Winnik et al. . |
| 5,271,765 | 12/1993 | Ma . |
| 5,272,201 | 12/1993 | Ma et al. . |
| 5,275,646 | 1/1994 | Marshall et al. . |
| 5,279,652 | 1/1994 | Kaufmann et al. . |
| 5,282,894 | 2/1994 | Albert et al. . |
| 5,284,734 | 2/1994 | Blum et al. . |
| 5,286,286 | 2/1994 | Winnik et al. . |
| 5,286,288 | 2/1994 | Tobias et al. . |
| 5,294,528 | 3/1994 | Furutachi . |
| 5,296,275 | 3/1994 | Goman et al. . |
| 5,296,556 | 3/1994 | Frihart . |
| 5,298,030 | 3/1994 | Burdeska et al. . |
| 5,300,403 | 4/1994 | Angelopolus et al. . |
| 5,300,654 | 4/1994 | Nakajima et al. . |
| 5,302,195 | 4/1994 | Helbrecht . |
| 5,302,197 | 4/1994 | Wickramanayake et al. . |
| 5,310,778 | 5/1994 | Shor et al. . |
| 5,312,713 | 5/1994 | Yokoyama et al. . |
| 5,312,721 | 5/1994 | Gesign . |
| 5,324,349 | 6/1994 | Sano et al. . |
| 5,328,504 | 7/1994 | Ohnishi . |
| 5,330,860 | 7/1994 | Grot et al. . |
| 5,334,455 | 8/1994 | Noren et al. . |

| | | |
|---|---|---|
| 5,338,319 | 8/1994 | Kaschig et al. . |
| 5,340,631 | 8/1994 | Matsuzawa et al. . |
| 5,340,854 | 8/1994 | Martic et al. . |
| 5,344,483 | 9/1994 | Hinton . |
| 5,356,464 | 10/1994 | Hickman et al. . |
| 5,362,592 | 11/1994 | Murofushi et al. . |
| 5,368,689 | 11/1994 | Agnemo . |
| 5,372,387 | 12/1994 | Wajda . |
| 5,372,917 | 12/1994 | Tsuchida et al. . |
| 5,374,335 | 12/1994 | Lindgren et al. . |
| 5,376,503 | 12/1994 | Audett et al. . |
| 5,383,961 | 1/1995 | Bauer et al. . |
| 5,384,186 | 1/1995 | Trinh . |
| 5,393,580 | 2/1995 | Ma et al. . |
| 5,401,303 | 3/1995 | Stoffel et al. . |
| 5,401,562 | 3/1995 | Akao . |
| 5,415,686 | 5/1995 | Kurabayashi et al. . |
| 5,415,976 | 5/1995 | Ali . |
| 5,424,407 | 6/1995 | Tanaka et al. . |
| 5,425,978 | 6/1995 | Berneth et al. . |
| 5,426,164 | 6/1995 | Babb et al. . |
| 5,427,415 | 6/1995 | Chang . |
| 5,429,628 | 7/1995 | Trinh et al. . |
| 5,431,720 | 7/1995 | Nagai et al. . |
| 5,432,274 | 7/1995 | Luong et al. . |
| 5,445,651 | 8/1995 | Thoen et al. . |
| 5,445,842 | 8/1995 | Tanaka et al. . |
| 5,455,074 | 10/1995 | Nohr et al. . |
| 5,455,143 | 10/1995 | Ali . |
| 5,459,014 | 10/1995 | Nishijima et al. . |
| 5,464,472 | 11/1995 | Horn et al. . |
| 5,466,283 | 11/1995 | Kondo et al. . |
| 5,474,691 | 12/1995 | Severns . |
| 5,475,080 | 12/1995 | Gruber et al. . |
| 5,476,540 | 12/1995 | Shields et al. . |
| 5,479,949 | 1/1996 | Battard et al. . |
| 5,489,503 | 2/1996 | Toan . |
| 5,498,345 | 3/1996 | Jollenbeck et al. . |
| 5,501,774 | 3/1996 | Burke . |
| 5,501,902 | 3/1996 | Kronzer . |
| 5,503,664 | 4/1996 | Sano et al. . |
| 5,509,957 | 4/1996 | Toan et al. . |
| 5,531,821 | 7/1996 | Wu . |
| 5,532,112 | 7/1996 | Kohler et al. . |
| 5,541,633 | 7/1996 | Winnik et al. . |
| 5,543,459 | 8/1996 | Hartmann et al. . |
| 5,569,529 | 10/1996 | Becker et al. . |
| 5,571,313 | 11/1996 | Mafune et al. . |
| 5,575,891 | 11/1996 | Trokhan et al. . |
| 5,580,369 | 12/1996 | Belding et al. . |
| 5,591,489 | 1/1997 | Dragner et al. . |
| 5,597,405 | 1/1997 | Grigoryan et al. . |
| 5,607,803 | 3/1997 | Murofushi et al. . |
| 5,616,443 | 4/1997 | Nohr et al. . |
| 5,635,297 | 6/1997 | Ogawa et al. . |
| 5,643,356 | 7/1997 | Nohr et al. . |
| 5,643,631 | 7/1997 | Donigian et al. . |
| 5,643,701 | 7/1997 | Nohr et al. . |
| 5,645,964 | 7/1997 | Nohr et al. . |
| 5,672,392 | 9/1997 | De Clercq et al. . |
| 5,681,380 | 10/1997 | Nohr et al. . |
| 5,683,843 | 11/1997 | Nohr et al. . |
| 5,685,754 | 11/1997 | Nohr et al. . |
| 5,686,503 | 11/1997 | Nohr et al. . |
| 5,700,582 | 12/1997 | Sargeant et al. . |
| 5,700,850 | 12/1997 | Nohr et al. . |
| 5,705,247 | 1/1998 | Arai et al. . |
| 5,709,955 | 1/1998 | Nohr et al. . |
| 5,709,976 | 1/1998 | Malhotra . |
| 5,721,287 | 2/1998 | Nohr et al. . |
| 5,733,693 | 3/1998 | Nohr et al. . |
| 5,738,932 | 4/1998 | Kondo et al. . |
| 5,739,175 | 4/1998 | Nohr et al. . |
| 5,747,550 | 5/1998 | Nohr et al. . |
| 5,773,182 | 6/1998 | Nohr et al. . |
| 5,782,963 | 7/1998 | Nohr et al. . |
| 5,786,132 | 7/1998 | Nohr et al. . |
| 5,798,015 | 8/1998 | Nohr et al. . |
| 5,811,199 | 9/1998 | MacDonald et al. . |
| 5,837,429 | 11/1998 | Nohr et al. . |
| 5,849,411 | 12/1998 | Nohr et al. . |
| 5,855,655 | 1/1999 | Nohr et al. . |
| 5,865,471 | 2/1999 | Nohr et al. . |
| 5,883,161 | 3/1999 | Wood et al. . |
| 5,885,337 | 3/1999 | Nohr et al. . |
| 5,891,229 | 4/1999 | Nohr et al. . |
| 5,911,855 | 6/1999 | Dransmann et al. . |

FOREIGN PATENT DOCUMENTS

| | | |
|---|---|---|
| 1022801 | 1/1958 | (DE) . |
| 1039835 | 9/1958 | (DE) . |
| 1040562 | 10/1958 | (DE) . |
| 1045414 | 12/1958 | (DE) . |
| 1047013 | 12/1958 | (DE) . |
| 1132540 | 7/1962 | (DE) . |
| 1154069 | 9/1963 | (DE) . |
| 1240811 | 5/1967 | (DE) . |
| 2202497 | 8/1972 | (DE) . |
| 2432563 | 2/1975 | (DE) . |
| 2437380 | 2/1975 | (DE) . |
| 2444520 | 3/1975 | (DE) . |
| 2216259 | 10/1975 | (DE) . |
| 2714978 | 10/1977 | (DE) . |
| 2722264 | 11/1978 | (DE) . |
| 158237 | 1/1983 | (DE) . |
| 3126433 | 1/1983 | (DE) . |
| 3415033 | 10/1984 | (DE) . |
| 271512 | 9/1989 | (DE) . |
| 3921600 | 1/1990 | (DE) . |
| 3833437 | 4/1990 | (DE) . |
| 3833438 | 4/1990 | (DE) . |
| 004036328 | 7/1991 | (DE) . |
| 4132288 | 4/1992 | (DE) . |
| 4126461 | 2/1993 | (DE) . |
| 0003884 | 9/1979 | (EP) . |
| 0029284 | 5/1981 | (EP) . |
| 0127574 | 12/1984 | (EP) . |
| 0 209 831 | 1/1987 | (EP) . |
| 0223587 | 5/1987 | (EP) . |
| 0262533 | 4/1988 | (EP) . |
| 0280458 | 8/1988 | (EP) . |
| 0 303 803 | 2/1989 | (EP) . |
| 0308274 | 3/1989 | (EP) . |
| 0351615 | 1/1990 | (EP) . |
| 0371304 | 6/1990 | (EP) . |
| 0373662 | 6/1990 | (EP) . |
| 0375160 | 6/1990 | (EP) . |
| 0390439 | 10/1990 | (EP) . |
| 0458140A1 | 10/1991 | (EP) . |
| 0458140 | 11/1991 | (EP) . |
| 0468465 | 1/1992 | (EP) . |
| 0 469 595 | 2/1992 | (EP) . |
| 0 475 075 | 3/1992 | (EP) . |
| 0542286 | 5/1993 | (EP) . |
| 000571190 | 11/1993 | (EP) . |
| 0 605 840 | 7/1994 | (EP) . |
| 0608433 | 8/1994 | (EP) . |
| 0609159 | 8/1994 | (EP) . |
| 0 635 380 | 1/1995 | (EP) . |
| 0639664 | 2/1995 | (EP) . |
| 0 673 779 | 9/1995 | (EP) . |
| 0 716 929 | 6/1996 | (EP) . |

| | | | | | | |
|---|---|---|---|---|---|---|
| 0 737 592 | 10/1996 | (EP) . | | 424756 | 3/1988 | (JP) . |
| 0755984 | 1/1997 | (EP) . | | 63-48370 | 3/1988 | (JP) . |
| 0 805 152 | 11/1997 | (EP) . | | 63-95439 | 4/1988 | (JP) . |
| 0 861 880 | 9/1998 | (EP) . | | 63-95440 | 4/1988 | (JP) . |
| 2445010 | 4/1975 | (FR) . | | 63-95445 | 4/1988 | (JP) . |
| 2383157 | 10/1978 | (FR) . | | 63-95446 | 4/1988 | (JP) . |
| 275245 | 10/1928 | (GB) . | | 63-95447 | 4/1988 | (JP) . |
| 349339 | 5/1931 | (GB) . | | 63-95448 | 4/1988 | (JP) . |
| 355686 | 8/1931 | (GB) . | | 63-95449 | 4/1988 | (JP) . |
| 399753 | 10/1933 | (GB) . | | 63-95450 | 4/1988 | (JP) . |
| 441085 | 1/1936 | (GB) . | | 63-151946 | 6/1988 | (JP) . |
| 463515 | 4/1937 | (GB) . | | 63-164953 | 7/1988 | (JP) . |
| 492711 | 9/1938 | (GB) . | | 63-165498 | 7/1988 | (JP) . |
| 518612 | 3/1940 | (GB) . | | 63-223077 | 9/1988 | (JP) . |
| 539912 | 9/1941 | (GB) . | | 63-223078 | 9/1988 | (JP) . |
| 626727 | 7/1947 | (GB) . | | 63-243101 | 10/1988 | (JP) . |
| 600451 | 4/1948 | (GB) . | | 63-199781 | 12/1988 | (JP) . |
| 616362 | 1/1949 | (GB) . | | 63-297477 * | 12/1988 | (JP) . |
| 618616 | 2/1949 | (GB) . | | 64-15049 | 1/1989 | (JP) . |
| 779389 | 7/1957 | (GB) . | | 6429337 | 1/1989 | (JP) . |
| 1150987 | 5/1969 | (GB) . | | 64-40948 | 2/1989 | (JP) . |
| 1372884 | 11/1974 | (GB) . | | 89014948 | 3/1989 | (JP) . |
| 2146357 | 4/1985 | (GB) . | | 1-128063 | 5/1989 | (JP) . |
| 662500 | 4/1964 | (IT) . | | 1146974 | 6/1989 | (JP) . |
| 4315663 | 7/1968 | (JP) . | | 01210477 | 8/1989 | (JP) . |
| 4726653 | 7/1972 | (JP) . | | 1288854 | 11/1989 | (JP) . |
| 4745409 | 11/1972 | (JP) . | | 2-58573 | 2/1990 | (JP) . |
| 49-8909 | 2/1974 | (JP) . | | 292957 | 4/1990 | (JP) . |
| 50-65592 | 6/1975 | (JP) . | | 2179642 | 7/1990 | (JP) . |
| 51-17802 | 2/1976 | (JP) . | | 2282261 | 11/1990 | (JP) . |
| 53-104321 | 9/1978 | (JP) . | | 3-134072 | 6/1991 | (JP) . |
| 55-62059 | 5/1980 | (JP) . | | 03163566 | 7/1991 | (JP) . |
| 55-90506 | 7/1980 | (JP) . | | 3-170415 | 7/1991 | (JP) . |
| 56-8134 | 1/1981 | (JP) . | | 3-206439 | 9/1991 | (JP) . |
| 0014233 | 2/1981 | (JP) . | | 3-258867 | 11/1991 | (JP) . |
| 56-14569 | 2/1981 | (JP) . | | 3-203694 | 12/1991 | (JP) . |
| 56-24472 | 3/1981 | (JP) . | | 3284668 | 12/1991 | (JP) . |
| 56-36556 | 4/1981 | (JP) . | | 4023884 | 1/1992 | (JP) . |
| 57-61055 | 4/1982 | (JP) . | | 4023885 | 1/1992 | (JP) . |
| 57-128283 | 8/1982 | (JP) . | | 4-45174 | 2/1992 | (JP) . |
| 57-171775 | 10/1982 | (JP) . | | 4100801 | 4/1992 | (JP) . |
| 58-124452 | 7/1983 | (JP) . | | 4-136075 | 5/1992 | (JP) . |
| 58-125770 | 7/1983 | (JP) . | | 04356087 | 12/1992 | (JP) . |
| 58-222164 | 12/1983 | (JP) . | | 543806 | 2/1993 | (JP) . |
| 59-89360 | 5/1984 | (JP) . | | 561220 | 3/1993 | (JP) . |
| 29219270 | 12/1984 | (JP) . | | 5080506 | 4/1993 | (JP) . |
| 59-219270 | 4/1985 | (JP) . | | 05119506 | 5/1993 | (JP) . |
| 60-192729 | 10/1985 | (JP) . | | 5134447 | 5/1993 | (JP) . |
| 60-239739 | 11/1985 | (JP) . | | 5-140498 | 6/1993 | (JP) . |
| 60-239740 | 11/1985 | (JP) . | | 2-219869 | 9/1993 | (JP) . |
| 60-239741 | 11/1985 | (JP) . | | 5263067 | 10/1993 | (JP) . |
| 60-239743 | 11/1985 | (JP) . | | 680915 | 3/1994 | (JP) . |
| 61-14994 | 1/1986 | (JP) . | | 6116555 | 4/1994 | (JP) . |
| 61-14995 | 1/1986 | (JP) . | | 6116556 | 4/1994 | (JP) . |
| 61-21184 | 1/1986 | (JP) . | | 6116557 | 4/1994 | (JP) . |
| 61-288 | 1/1986 | (JP) . | | 6-175584 | 6/1994 | (JP) . |
| 61-3781 | 1/1986 | (JP) . | | 6214339 | 8/1994 | (JP) . |
| 61-25885 | 2/1986 | (JP) . | | 6256494 | 9/1994 | (JP) . |
| 61-30592 | 2/1986 | (JP) . | | 6256633 | 9/1994 | (JP) . |
| 61-40366 | 2/1986 | (JP) . | | 7113828 | 4/1972 | (NL) . |
| 61-77846 | 4/1986 | (JP) . | | 1310767 | 5/1987 | (RU) . |
| 61-128973 | 6/1986 | (JP) . | | 1772118 | 10/1992 | (SU) . |
| 61-97025 | 9/1986 | (JP) . | | 92/11295 | 7/1992 | (WO) . |
| 61-222789 | 10/1986 | (JP) . | | 93/06597 | 4/1993 | (WO) . |
| 61-247703 | 11/1986 | (JP) . | | 94/01503 | 1/1994 | (WO) . |
| 61-285403 | 12/1986 | (JP) . | | 94/22500 | 10/1994 | (WO) . |
| 627703 | 1/1987 | (JP) . | | 94/22501 | 10/1994 | (WO) . |
| 62-100557 | 5/1987 | (JP) . | | 95/04955 | 2/1995 | (WO) . |
| 62-97881 | 5/1987 | (JP) . | | 95/28285 | 10/1995 | (WO) . |
| 62-127281 | 6/1987 | (JP) . | | 96/00740 | 1/1996 | (WO) . |
| 63-43959 | 2/1988 | (JP) . | | 96/19502 | 6/1996 | (WO) . |

| | | |
|---|---|---|
| 96/22335 | 7/1996 | (WO) . |
| 96/24636 | 8/1996 | (WO) . |
| 97/20000 | 6/1997 | (WO) . |
| 97/35933 | 10/1997 | (WO) . |
| 98/23695 | 6/1998 | (WO) . |

OTHER PUBLICATIONS

Abstract of patent, JP 6–80915 (Canon Inc.), Mar. 22, 1994.
Abstract of patent, JP 06–43573 (Iku Meji) (Feb. 18, 1994).
Pitchumani, K. "Modification of chemical reactivity upon cyclodextrin encapsulation" *Chemical Abstracts* 1 2 1 982 [No. 121:133624v] 1994, no month available.
Wijesekera, T.P., et al. Synthetic Aspects of Pophyrin and Metalloporphyrin Chemistry *Metalloporpyrins in Catalytic Oxidations* pp. 202–203, 206–207, 1994, no month available.
Derwent Publications Ltd., London, JP 05297627 (Fujitsu Ltd.), Nov. 12, 1993, (Abstract).
Patent Abstracts of Japan, JP 5241369 (Bando Chem Ind Ltd et al.), Sep. 21, 1993. (Abstract).
Derwent Publications Ltd., London, JP 05232738 (Yamazaki, T.), Sep. 10, 1993. (Abstract).
Derwent Publications Ltd., London, EP 000559310 (Zeneca Ltd.), Sep. 8, 1993. (Abstract).
Derwent Publications Ltd., London, J,A, 5–230410 (Seiko Epson Corp), Sep. 7, 1993. (Abstract).
Derwent Publications Ltd., London, JP 5–230407 (Mitsubishi Kasei Corp), Sep. 7, 1993. (Abstract).
Abstract Of Patent, JP 405230410 (Seiko Epson Corp.), Sep. 7, 1993. (Abstract).
Abstract Of Patent, JP 405230407 (Mitsubishi Kasei Corp.), Sep. 7, 1993. (Abstract).
Patent Abstracts of Japan, JP 5197198 (Bando Chem Ind Ltd et al.), Aug. 6, 1993, (Abstract).
Database WPI—Derwent Publications Ltd., London, J,A, 5197069 (Bando Chem), Aug. 6, 1993. (Abstract).
Abstract of patent JP 5–195450 (Nitto Boseki Co. Ltd), Aug. 3, 1993.
Derwent World Patents Index JP 5186725 (Seiko Epson Corp.), Jul. 27, 1993. abstract.
Patent Abstracts of Japan, JP 5181308 (Bando Chem Ind Ltd et al.), Jul. 23, 1993. (Abstract).
Patent Abstracts of Japan, JP 5181310 (Bando Chem Int Ltd et al.), Jul. 23, 1993. (Abstract).
Derwent Publications Ltd., London, JP 5–132638 (Mitsubishi Kasei Corp), May 28, 1993. (Abstract).
Abstract Of Patent JP 405132638 (Mitsubishi Kasei Corp.), May 28, 1993. (Abstract).
Derwent Publications Ltd., London, JP 5–125318 (Mitsubishi Kasei Corp), May 21, 1993. (Abstract).
Abstract Of Patent, JP 405125318 (Mitsubishi Kasei Corp.), May 21, 1993. (Abstract).
Abstract of patent, JP 05–117200 (Hidefumi Hirai et al.) (May 14, 1993).
Derwent World Patents Index, JP 5117105 (Mitsui Toatsu Chem Inc.) May 14, 1993.
Derwent Publications Ltd., London, JP 05061246 (Ricoh KK), Mar. 12, 1993. (Abstract).
Husain, N. et al. "Cyclodextrins as mobile–phase additives in reversed–phase HPLC" *American Laboratory* 82 80–87 1993, no month available.
Hamilton, D.P. "Tired of Shredding? New Ricoh Method Tries Different Task" *Wall Street Journal* B2 1993, no month available.

"Cyclodextrins: A Breakthrough for Molecular Encapsulation" *American Maize Products Co.* (*AMAIZO*) 1993, no month available.
Duxbury "The Photochemistry and Photophysics of Triphenylmethane Dyes in Solid Liquid Media" *Chemical Review* 93 381–433 1993, no month available.
Abstract of patent, JP 04–351603 (Dec. 7, 1992).
Abstract of patent, JP 04–351602 1992, no month available.
Derwent Publications, Ltd., London, JP 404314769 (Citizen Watch Co. Ltd.), Nov. 5, 1992. (Abstract).
Abstract of patent, JP 04315739 1992, no month available.
Derwent Publications Ltd., London, JP 04300395 (Funai Denki KK), Oct. 23, 1992. (Abstract).
Derwent Publications Ltd., London, JP 404213374 (Mitsubishi Kasei Corp), Aug. 4, 1992. (Abstract).
Abstract of patent, JP 04–210228 1992, no month available.
Abstract Of Patent, JP 404202571 (Canon Inc.), Jul. 23, 1992. (Abstract).
Abstract Of Patent, JP 404202271 (Mitsubishi Kasei Corp.), Jul. 23, 1992. (Abstract).
Derwent WPI, JP 4–197657 (Toshiba KK) Jul. 17, 1992, abstract.
Derwent Publications Ltd., London, JP 4–189877 (Seiko Epson Corp), Jul. 8, 1992 (Abstract).
Derwent Publications Ltd., London, JP 404189876 (Seiko Epson Corp), Jul. 8, 1992. (Abstract).
Abstract Of Patent, JP 404189877 (Seiko Epson Corp.), Jul. 8, 1992. (Abstract).
Derwent Publications Ltd., London, J,A, 4–170479 (Seiko Epson Corp), Jun. 18, 1992. (Abstract).
Abstract of patent, JP 04–81402 1992, no month available.
Abstract of patent, JP 04–81401 1992, no month available.
Kogelschatz "Silent–discharge drive excimer UV sources and their applications" *Applied Surface Science* 410–423 1992, no month available.
Derwent Publications, Ltd., London, JP 403269167 (Japan Wool Textile KK), Nov. 29, 1991 (Abstract).
Derwent Publications Ltd., London, JO 3247676 (Canon KK), Nov. 5, 1991 (Abstract).
Abstract of patent, JP 03–220384 1991, no month available.
Patent Abstracts of Japan, JP 03184896 (Dainippon Printing Co Ltd.) Aug. 12, 1991.
Derwent Publications Ltd., London, JP 3167270 (Mitsubishi Kasei Corp), Jul. 19, 1991. (Abstract).
Derwent Publications Ltd., London, JO 3167270 (Mitsubishi Kasei Corp.), Jul. 19, 1991 (Abstract).
Derwent World Patents Index EP 435536 (Canon KK) Jul. 3, 1991. abstract.
Derwent Publications Ltd., London, JO 3093870 (Dainippon Ink Chem KK.), Apr. 18, 1991 (Abstract).
Abstract of patent, JP 06369890 1991, no month available.
Kogelschatz, U. et al. "New Excimer UV Sources for Industrial Applications" *ABB Review* 391 1–10 1991, no month available.
Abstract of patent, JP 03–41165 1991, no month available.
"Coloring/Decoloring Agent for Tonor Use Developed" *Japan Chemical Week* 1991, no month available.
Braithwaite, M., et al. "Formulation" *Chemistry & Technology of UV & EB Formulation for Coatings, Inks & Paints* IV 11–12 1991, no month available.
Scientific Polymer Products, Inc. Brochure 24–31 1991, no month available.

Dietliker, K. "Photoiniators for Free Radical and Cationic Polymerisation" *Chem & Tech of UV & EB Formulation for Coatings, Inks & Paints* III 61, 63, 229–232, 280, 405, 1991, no month available.

Esrom et al. "Large area Photochemical Dry Etching of Polymers iwth Incoherent Excimer UV Radiation" *MRS Materials Research Society* 1–7 1991, no month available.

Esrom et al. Excimer Laser–Induced Decompostion of Aluminum *Nitride Materials Research Society Fall Meeting,* 1–6 1991, no month available.

Esrom et al. "Metal deposition with a windowless VUV excimer source" *Applied Surface Science* 1–5 1991, no month available.

Esrom "Excimer Laser–Induced Surface Activation of Aln for Electroless Metal Deposition" *Mat. Res. Sco.lSymp. Proc.* 204 457–465 1991, no month available.

Zhang et al. "UV–induced decompositin of adsorbed Cu–acetylacetonate films at room temperature for electroless metal plating" *Applied Surface Science* 1–6 1991, no month available.

"German company develops reusable paper" *Pulp & Paper* 1991, no month available.

Abstract of patent, JP 02289652 1990, no month available.

Ohashi et al. "Molecular Mechanics Studies on Inclusion Compounds of Cyanine Dye Monomers and Dimers in Cyclodextrin Cavities," *J. Am. Chem. Soc.* 112 5824–5830 1990, no month available.

Kogelschatz et al. "New Incoherent Ultraviolet Excimer Sources for Photolytic Material Deposition," *Laser Und Optoelektronik* 1990, no month available.

Patent Abstracts of Japan, JP 02141287 (Dainippon Printing Co Ltd.) May 30, 1990.

Abstract of Patent, JP 0297957, (Fuji Xerox Co., Ltd.) 1990, no month available.

Derwent Publications Ltd., London, JP 2091166 (Canon KK), Mar. 30, 1990. (Abstract).

Esrom et al. "Metal Deposition with Incoherent Excimer Radiation" *Mat. Res. Soc. Symp. Proc.* 158 189–198 1990, no month available.

Esrom "UV Excimer Laser–Induced Deposition of Palladium from palladiym Acetate Films" *Mat. Res. Soc. Symp. Proc.* 158 109–117 1990, no month available.

Kogelschatz, U. "Silent Discharges for the Generation of ultraviolet and vacuum ultraviolet excimer radiation" *Pure & Applied Chem.* 62 1667–74 1990, no month available.

Esrom et al. "Investigation of the mechanism of the UV–induced palladium depostions processf from thin solid palladium acetate films" *Applied Surface Science* 46 158–162 1990, no month available.

Zhang et al. "VUV synchrotron radiation processing of thin palladium acetate spin–on films for metallic surface patterning" *Applied Surface Science* 46 153–157 1990, no month available.

Brennan et al. "Stereoelectronic effects in ring closure reactions: the 2'-hydroxychalcone—flavanone equilibrium, and related systems," *Canadian J. Chem.* 68(10) pp. 1780–1785 1990, no month available.

Abstract of patent, JP 01–299083 1989, no month available.

Derwent Publications Ltd., London, J,O, 1182379 (Canon KK), Jul. 20, 1989. (Abstract).

Derwent Publications Ltd., London, JO 1011171 (Mitsubishi Chem Ind. KK.), Jan. 13, 1989 (Abstract).

Gruber, R.J., et al. "Xerographic Materials" *Encyclopedia of Polymer Science and Engineering* 17 918–943 1989, no month available.

Pappas, S.P. "Photocrosslinking" *Comph. Pol. Sci.* 6 135–148 1989, no month available.

Pappas, S.P. "Photoinitiated Polymerization" *Comph. Pol. Sci.* 4 337–355 1989, no month available.

Kirilenko, G.V. et al. "An analog of the vesicular process with amplitude modulation of the incident light beam" *Chemical Abstracts* 111 569 [No. 111:123633b] 1989, no month available.

Esrom et al. "UV excimer laser–induced pre–nucleation of surfaces followed by electroless metallization" *Chemtronics* 4 216–223 1989, no month available.

Esrom et al. "VUV light–induced depostion of palladium using an incoherent Xe2* excimer source" *Chemtronics* 4 1989, no month available.

Esrom et al. "UV Light–Induced Depostion of Copper Films" C5–719–C5–725 1989, no month available.

Falbe et al. *Rompp Chemie Lexikon* 9 270 1989, no month available.

Allen, Norman S. *Photopolymerisation and Photoimaging Science and Technology* pp. 188–199; 210–239 1989, no month available.

Patent Abstracts of Japan, JP 63297477 (Fuji Photo Film Co. Ltd.) Dec. 5, 1988, abstract.

Derwent Publications, Ltd., London, SU 1423656 (Kherson Ind Inst), Sep. 15, 1988 (Abstract).

Derwent Publications, Ltd., London, EP 0280653 (Ciba Geigy AG), Aug. 31, 1988 (Abstract).

Abstract of patent, JP 63–190815 1988, no month available.

Patent Abstracts of Japan, JP 63179985 (Tomoegawa Paper Co. Ltd.), Jul. 23, 1988.

Derwent World Patents Index, JP 63179977 (Tomoegawa Paper Mfg Co Ltd), Jul. 23, 1988.

Furcone, S. Y. et al. "Spin–on B14Sr3Ca3Cu4O16+x superconducting thin films from citrate precursors," *Appl. Phys. Lett.* 52(25) 2180–2182 1988, no month available.

Abstract of patent, JP 63–144329 1988, no month available.

Abstract of patent, JP 63–130164 1988, no month available.

Derwent Publications, Ltd., London, J6 3112770 (Toray Ind. Inc), May 17, 1988 (Abstract).

Derwent Publications, Ltd., London, J6 3108074 (Konishiroku Photo KK), May 12, 1988 (Abstract).

Derwent Publications, Ltd., London,J6 3108073 (Konishiroku Photo KK), May 12, 1988 (Abstract).

Abstract of patent, JP 61–77846 1988, no month available.

Abstract of patent, JP 63–73241 1988, no month available.

Abstract of patent, JP 63–47762, 1988, no month available.

Abstract of patent, JP 63–47763, 1988, no month available.

Abstract of patent, JP 63–47764, 1988, no month available.

Abstract of patent, JP 63–47765 1988, no month available.

Eliasson, B., et al. "UV Excimer Radiation from Dielectric–Barrier Discharges" *Applied Physics B* 46 299–303 1988, no month available.

Eliasson et al. "New Trends in High Intensity UV Generation" *EPA Newsletter* (32) 29–40 1988, no month available.

Cotton, F.A. "Oxygen Group Via(16)" *Advanced Inorganic Chemistry* 5th ed. 473–474 1988, no month available.

Derwent Publications, Ltd., London, J6 2270665 (Konishiroku Photo KK), Nov. 25, 1987 (Abstract).

Abstract of patent, JP 62–215261 1987, no month available.

Derwent World Patents Index JP 62064874 (Dainichiseika Color & Chem Mfg.), Mar. 23, 1987. abstract.

Database WPI, Derwent Publications Ltd., London, JP 62032082 (Mitsubishi Denki KK), Feb. 12, 1987. (Abstract).
Abstract of patent, JP 62–32082 1987, no month available.
Derwent Publications Ltd., London, J6 2007772 (Alps Electric KK.), Jan. 14, 1987 (Abstract).
Baufay et al. "Optical self–regulation during laser–induced oxidation of copper" *J. Appl. Phys* 61(9) 4640–4651 1987, no month available.
Al–Ismail et al. "Some experienced results on thin polypropylene films loaded with finely–dispersed copper" *Journal of Materials Science* 415–418 1987, no month available.
Gross et al. "Laser–direct–write metallization in thin palladium acetate films" *J. App. Phys.* 61(4) 1628–1632 1987, no month available.
Derwent Publications Ltd., London, JA 0284478 (Sanyo Chem Ind Ltd.), Dec. 15, 1986 (Abstract).
Abstract of patent, JP 61251842 1986, no month available.
Database WPI, Derwent Publications Ltd., London, GB; SU, A, 1098210 (Kutulya L A) Jun. 23, 1986.
Abstract of patent, JP 61–97025 1986, no month available.
Abstract of patent, JP 61–87760 1986, no month available.
Derwent Publications Ltd., London, DL 0234731 (Karl Marx Univ. Leipzig), Apr. 9, 1986. (Abstract).
Derwent World Patents Index, SU 1219612 (AS USSR NON–AQ SOLN) Mar. 23, 1986.
Derwent Publications, Ltd., London, J6 1041381 (Osaka Prefecture), Feb. 27, 1986 (Abstract).
Dialog, JAPIO, JP 61–034057 (Ciba Geigy AG) Feb. 18, 1986.
Derwent World Patents Index, JP 61027288 (sumitomo Chem Ind KK) Feb. 6, 1986.
Sakai et al. "A Novel and Practical Synthetic Method of 3(2H)–Furanone Derivatives," *J. Heterocyclie Chem.* 23 pp. 1199–1201 1986, no month available.
Jellinek, H.H.G. et al. "Evolution of H2O and CO2 During the Copper–Catalyzed Oxidation of Isotactic Polypropylene," *J. Polymer Sci.* 24 389–403 1986, no month available.
Jellinek, H.H.G. et al. "Diffusion of Ca2+ Catalysts from Cu–Metal Polymer or Cu–Oxide/Polymer Interfaces into Isotactic Polypropylene," *J. Polymer Sci.* 24 503–510 1986, no month available.
John J. Eisch and Ramiro Sanchez "Selective Oxophilic Imination of Ketones with Bis (dichloroaluminum) Phenylimide" *J. Org. Chem.* 51(10) 1848–1852 1986, no month available.
Derwent Publications Ltd., London, J6 0226575 (Sumitomo Chem Ind Ltd.), Oct. 11, 1985 (Abstract).
Abstract of patent, JP 60–156761 1985, no month available.
Derwent World Patents Index DE 3443565 (Mitsubishi Yuka Fine Che. et al.) Jul. 11, 1985. abstract.
Derwent Publications Ltd., London, J,A, 0011451 (Fugi Photo Film KK), Jan. 21, 1985. (Abstract).
Derwent Publications Ltd., London J6 0011449–A (Taoka Chemical KK) Jan. 21, 1985 (abstract).
Derwent World Patents Index JP 60–008088 (Mitsubishi Paper Mills Ltd.) Jan. 16, 1985. abstract.
Roos, G. et al. "Textile applications of photocrosslinkable polymers" *Chemical Abstracts* 103 57 [No. 103:23690j] 1985, no month available.
Beck, M.T., et al. Mechanism of the autophotosensitized formulation of porphyrins in the reaction of pyrrole and m–disulfonated *Chemical Abstracts* 198 5:45362 1985, no month available.

Derwent World Patents Index, EP 127574 (Ciba Geigy AG), Dec. 5, 1984.
Derwent Publications Ltd., London, JP 0198187 (Canon KK), Nov. 9, 1984. (Abstract).
Derwent Publications Ltd., London, J,A, 0169883 (Ricoh KK), Sep. 25, 1984. (Abstract).
Derwent Publications Ltd., London, JA 0169883 (Ricoh KK), Sep. 25, 1984 (Abstract).
Derwent Publications Ltd., London, JA 0198187 (Canon KK), Nov. 9, 1984 (Abstract).
Derwent Publications Ltd., London, J,A, 0053563 (Dainippon Toryo KK), Mar. 28, 1984. (Abstract).
Derwent Publications Ltd., London, J,A, 0053562 (Dainippon Toryo KK), Mar. 28, 1984. (Abstract).
Abstract of Patent, JA 0053563 (Dainippon Toryo KK), Mar. 28, 1984 (Abstract).
Abstract of Patent JA 0053562 (Dainippon Toryo KK), Mar. 28, 1984 (Abstract).
Derwent Publications Ltd., London, J,A, 0051961 (Dainippon Toryo KK), Mar. 26, 1984). (Abstract).
Abstract of Patent, JA 0051961 (Dainippon Toryo KK), Mar. 26, 1984 (Abstract).
Saenger, W. "Structural Aspects of Cyclodextrins and Their Inclusion Complexes" *Inclusion Compounds—Structural Aspects of Inclusion Compounds formed by Organic Host* 2 231–259 1984, no month available.
Szejtli "Industrial Applications of Cyclodextrins" *Inclusion Compounds: Physical Prop. & Applns* 3 331–390 1984, no month available.
Kano et al. "Three–Component Complexes of Cyclodextrins. Exciplex Formation in Cyclodextrin Cavity," *J. Inclusion Phenomena* 2 pp. 737–746 1984, no month available.
Suzuki et al. "Spectroscopic Investigation of Cyclodextrin Monomers, Derivatives, Polymers and Azo Dyes," *J. Inclusion Phenomena* 2, pp. 715–724 1984, no month available.
Abstract of Patent, JA 0222164 (Ricoh KK), Dec. 23, 1983 (Abstract).
Abstract of patent, JP 58211426 (Sekisui Plastics KK), (Dec. 8, 1983).
Derwent Publications, Ltd., London, EP 0072775 (Ciba Geigy AG), Feb. 23, 1983 (Abstract).
van Beek, H.C.A "Light–Induced Colour Changes in Dyes and Materials" *Color Res. and Appl.* 8 176–181 1983, no month available.
Connors, K.A. "Application of a stoichiometric model of cyclodextrin complex formation" *Chemical Abstracts* 98 598 [No. 98:53067g] 1983, no month available.
Abstract of Patent, EP 0065617 (IBM Corp.), Dec. 1, 1982 (Abstract).
Derwent Publications Ltd., London, J,A, 0187289 (Honshu Paper Mfg KK), Nov. 17, 1982. (Abstract).
Abstract of Patent, JA 0187289 (Honsho Paper Mfg KK), Nov. 17, 1982 (Abstract).
Abstract of Patent, JA 0185364 (Ricoh KK), Nov. 15, 1982 (Abstract).
Derwent Publications, Ltd., London J5 7139146 (Showa Kako KK) Aug. 17, 1982 (abstract).
Abstract of Patent, JA 0090069 (Canon KK), Jun. 4, 1982 (Abstract).
Derwent Publications, Ltd., London, JA 0061785 (Nippon Senka KK), Apr. 14, 1982 (Abstract).
Fischer, "Submicroscopic contact imaging with visible light by energy transfer" *Appl. Phys. Letter* 40(3) 1982, no month available.

Abstract of Patent, JA 0010659 (Canon KK), Jan. 20, 1982 (Abstract).
Abstract of Patent, JA 0010661 (Canon KK), Jan. 20, 1982 (Abstract).
Christen "Carbonylverbindungen: Aldehyde und Ketone," *Grundlagen der Organischen Chemie* 255 1982, no month available.
Derwent Publications Ltd., London, J,A, 0155263 (Canon KK), Dec. 1, 1981. (Abstract).
Abstract of Patent, JA 0155263 (Canon KK), Dec. 1, 1981 (Abstract).
Abstract of Patent, JA 0147861 (Canon KK), Nov. 17, 1981 (Abstract).
Derwent Publications Ltd., London, J,A, 0143273 (Canon KK), Nov. 7, 1981. (Abstract).
Abstract of Patent, JP 56143272 (Canon KK), Nov. 7, 1981 (Abstract).
Abstract of Patent, JA 0136861 (Canon KK), Oct. 26, 1981 (Abstract).
Abstract of Patent, JA 6133378 (Canon KK), Oct. 19, 1981 (Abstract).
Abstract of Patent, JA 6133377 (Canon KK), Oct. 19, 1981 (Abstract).
Abstract of Patent, JA 6093775 (Canon KK), Jul. 29, 1981 (Abstract).
Derwent Publications Ltd., London, J,A, 0008135 (Ricoh KK), Jan. 27, 1981. (Abstract).
Derwent Publications Ltd., London, J,A, 0004488 (Canon KK), Jan. 17, 1981. (Abstract).
Abstract of Patent, JA 0004488 (Canon KK), Jan. 17, 1981 (Abstract).
Kirk–Othmer "Metallic Coatings," *Encyclopedia of Chemical Technology* 15 241–274 1981, no month available.
Komiyama et al. "One–Pot Preparation of 4–Hydroxychalcone β–Cyclodextrin as Catalyst," *Makromol. Chem.* 2 733–734 1981, no month available.
Derwent Publications, Ltd., London CA 1086–719 (Sherwood Medical) Sep. 30, 1980 (abstract).
Derwent Publications, Ltd., Database WPI, JP 55 113036 (Ricoh KK), Sep. 1, 1980.
Rosanske et al. "Stoichiometric Model of Cyclodextrin Complex Formation" *Journal of Pharmaceutical Sciences* 69(5) 564–567 1980, no month available.
Semple et al. "Synthesis of Functionalized Tetrahydrofurans," *Tetrahedron Letters* 81 pp. 4561–4564 1980, no month available.
Kirk–Othmer "Film Deposition Techniques," *Encyclopedia of Chemical Technology* 10 247–283 1980, no month available.
Derwent World Patents Index, Derwent Info. Ltd., JP 54158941 (Toyo Pulp KK), Dec. 15, 1979. (Abstract).
Derwent World Patents Index, JP 54117536 (Kawashima F) Sep. 12, 1979.
Derwent Publications Ltd., London, J,A, 0005422 (Fuji Photo Film KK), Jan. 16, 1979. (Abstract).
Drexhage et al. "Photo–bleachable dyes and processes" *Research Disclosure* 85–87 1979, no month available.
"Color imaging devices and color filter arrays using photo–bleachable dyes" *Research Disclosure* 22–23 1979, no month available.
Wolff, N.E., et al. "Electrophotography" *Kirk–Othmer Encyclopedia of Chemical Technology* 8 794–826 1979, no month available.

Derwent Publications Ltd., London, J,A, 0012037 (Pentel KK), Jan. 29, 1977. (Abstract).
Abstract of Patent, JA 0012037 (Pentel KK), Jan. 19, 1977 (Abstract).
Jenkins, P. W. et al. "Photobleachable dye material" *Research Disclosure* 18 [No. 12932] 1975, no month available.
Lamberts, R.L. "Recording color grid patterns with lenticules" *Research Disclosure* 18–19 [No. 12923] 1975, no month available.
Karmanova, L.S. et al. "Light stabilizers of daytime fluorescent paints" *Chemical Abstracts* 82 147 [No. 59971p] 1975, no month available.
Prokopovich, B. et al. "Selection of effective photoinducers for rapid hardening of polyester varnish PE–250" *Chemical Abstracts* 83 131 [No. 81334a] 1975, no month available.
"Variable Contrast Printing System" *Research Disclosure* 19 [No. 12931] 1975, no month available.
Lakshman "Electronic Absorption Spectrum of Copper Formate Tetrahydrate" *Chemical Physics Letters* 31(2) 331–334 1975, no month available.
Derwent Publications, Ltd., London J4 9131–226 (TNational Cash Register C) Dec. 16, 1974 (abstract).
Chang, I.F., et al. "Color Modulated Dye Ink Jet Printer" *IBM Technical Disclosure Bulletin* 17(5) 1520–1521 1974, no month available.
"Darocur 1173: Liquid Photoiniator for Ultraviolet Curing of Coatings" 1974.
Hosokawa et al. "Ascofuranone, an antibiotic from Ascochyta," Japan Kokai 73 91,278 (Nov. 28, 1973) *Merck Index* 80 p. 283; abstract 94259t 1974, no month available.
Abstract of patent, NL 7112489 (Dec. 27, 1971), no month available.
Gafney et al. "Photochemical Reactions of Copper (II)—1, 3–Diketonate Complexes" *Journal of the Americqal Chemical Society* 1971, no month available.
Derwent Publications, Ltd., London SU 292698–S Jan. 15, 1971 (abstract).
Derwent World Patents Index,CS 120380 (Kocourek, Jan) Oct. 15, 1966.
Tsuda, K., et al. Vinyl Polymerization. CXLVI. The influence of dibenzoyl disulfide derivatives on radical polymerizations *Chemical Abstract* 196 6:29 198 1966, no month available.
Rigdon, J.E. "In Search of Paper that Spies Can't Copy" *Wall Street Journal*, no date available.
Chatterjee, S. et al. "Photochemistry of Carbocyanine Alkyltriphenylborate Salts: Intro–Ion–Pair Electron Transfer and the Chemistry of Boranyl Radicals" *J. Am. Chem. Soc.* 112 6329–6338, no date available.
"Assay—Physical and Chemical Analysis of Complexes" *AMAIZO*, no date available.
"Cyclodextrin" *AMAIZO*, no date available.
"Beta Cyclodextrin Polymer (BCDP)" *AMAIZO*, no date available.
"Chemically Modified Cyclodextrins" *AMAIZO*, no date available.
"Cyclodextrin Complexation" *American Maize Products Co.*, no date available.
"Monomers" *Scientific Polymer Products, Inc.* no date available.
Suppan, Paul "Quenching of Excites States" *Chemistry and Light* 65–69, no date available.

Yamaguchi, H. et al. "Supersensitization. Aromatic ketones as supersensitizers" *Chemical Abstracts* 53 107 (d), no date available.

Stecher, H. "Ultraviolet–absorptive additives in adhesives, lacquers and plastics" *Chemical Abstracts* 53 14579 (c), no date available.

Maslennikov, A.S. "Coupling of diazonium salts with ketones" *Chemical Abstracts* 60 3128e, no date available.

Derwent Publications Ltd., London, 4 9128022 no date available.

Abstract of Patent, JP 405195450, no date available.

Rose, Philip I. "Gelatin," *Encyclopedia of Chemical Technology* 7 488–513, no date available.

* cited by examiner

US 6,228,157 B1

INK JET INK COMPOSITIONS

RELATED APPLICATIONS

This application claims the benefit of priority to provisional patent application Ser. No. 60/093,458, filed Jul. 20, 1998.

TECHNICAL FIELD

The present invention relates to colorant compositions, particularly to ink jet ink compositions.

BACKGROUND OF THE INVENTION

The use of pyrrolidone and glycols as suitable "solvents" in colorant compositions is well known in the art of ink jet printing. For example, U.S. Pat. No. 5,108,503 to Hindagolla et al., assigned to Hewlett-Packard Company, Palo Alto, Calif., discloses ink jet ink compositions containing one or more solvents in the form of pyrrolidones. Other ink compositions containing glycols as suitable solvents are disclosed in numerous patents including, but not limited to, U.S. Pat. Nos. 3,705,043; 4,381,946; 4,421,559; 4,853,037; 4,957,533; 4,973,499; 5,196,057; 5,207,824; 5,431,724; 5,560,771; and 5,624,484.

The above-mentioned ink compositions, containing one or more pyrrolidone and/or glycols, result in a hazy or dull color when applied to a number of ink-receiving substrates. Further, the above-described ink compositions possess an undesirable degree of tackiness when applied to a number of ink-receiving substrates. While the above-described ink compositions have a number of desirable properties, such as minimal spreading, smear resistance and waterfastness, the ink compositions still possess many shortcomings.

What is needed in the art is an ink jet ink composition which may be applied to an ink-receiving substrate without resulting in a hazy appearance or a tacky feel.

SUMMARY OF THE INVENTION

The present invention is directed to compositions containing a colorant and at least one water-soluble compound having the following general formula:

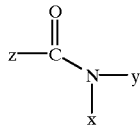

wherein x is hydrogen or an alkyl having from approximately 1 to 6 carbons; y is an alkyl having from approximately 1 to 6 carbons; and z is an alkyl having from approximately 1 to 6 carbons. The presence of the water-soluble compound results in an improved composition with minimal haziness and tackiness. In one embodiment of the present invention, the composition comprises an ink jet ink composition. Other compatible components may be added to the mixture to produce a composition having desired properties, such as lightfastness, waterfastness, pH, etc.

The present invention is also directed to ink-receiving substrates having the above-described composition thereon. Suitable ink-receiving substrates include substrates such as paper, wood, fabrics and films. The present invention is further directed to a method of printing an ink composition onto an ink-receiving substrate.

The present invention is also directed to a method of making a composition comprising a colorant and at least one water-soluble compound as described above. At least one water-soluble compound is incorporated into a mixture containing a colorant. The present invention is also directed to an ink jet ink cartridge containing the above-described composition.

These and other features and advantages of the present invention will become apparent after a review of the following detailed description of the disclosed embodiments and the appended claims.

DETAILED DESCRIPTION OF THE INVENTION

The compositions of the present invention contain a colorant and at least one water-soluble compound having the following general formula:

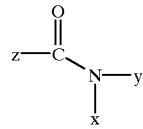

wherein x is hydrogen or an alkyl having from approximately 1 to 6 carbons; y is an alkyl having from approximately 1 to 6 carbons; and z is an alkyl having from approximately 1 to 6 carbons. The compositions possess waterfastness and smear resistance similar to or superior to colorant compositions of the prior art, but also have minimal haziness and tackiness regardless of the ink-receiving substrate. The present invention is also directed to ink-receiving substrates having the above-described composition thereon.

As used herein, the term "composition" and such variations as "colored composition" are used herein to mean a colorant and one or more water-soluble compounds described above. The composition may optionally include other compatible components.

As used herein, the term "colorant" is meant to include, without limitation, any material which typically will be an organic material, such as an organic colorant or dye. The term is meant to include a single material or a mixture of two or more materials.

The term "thereon" is used herein to mean thereon or therein. For example, the present invention includes a substrate having a colored composition thereon. According to the definition of "thereon" the colored composition may be present on the substrate or it may be in the substrate.

The water-soluble compounds used in the compositions of the present invention have the following general formula:

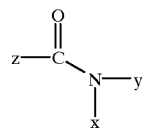

wherein x is hydrogen or an alkyl having from 1 to 6 carbons; y is an alkyl having from 1 to 6 carbons; and z is an alkyl having from 1 to 6 carbons. The substituents x, y and z are selected to result in a compound which is water soluble. In some desired embodiments, x is hydrogen; y is an alkyl having from 1 to 3 carbons; and z is an alkyl having from 1 to 3 carbons. In more desired embodiments, x is hydrogen; y is an alkyl having from 1 to 2 carbons; and z is an alkyl having from 1 to 2 carbons.

In one embodiment of the present invention, the water-soluble compound comprises

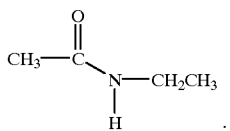

In a further embodiment, the water-soluble compound comprises

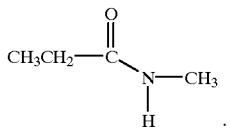

The water-soluble compound may be present in the composition in any amount as long as the composition is suitable for use. For example, when the composition is an ink jet ink composition, the amount of water-soluble compound may need to be less than for another type of coating. Desirably, the amount of water-soluble compound in the composition of the present invention is up to about 25 weight percent based on the total weight of the composition. In some desired embodiments of the present invention, the water-soluble compound is present in an amount of about 2 to 25 weight percent based on the total weight of the composition. In more desired embodiments of the present invention, the water-soluble compound is present in an amount of about 6 to 10 weight percent based on the total weight of the composition. The colorant may be present in the composition in any amount as long as the composition is suitable for use. Desirably, the amount of colorant in the composition of the present invention is from about 1 to about 10 weight percent colorant, and the balance water.

The compositions of the present invention may include any colorant known in the art. Suitable colorants include, bur are not limited to, dyes and pigments. Desirably, the colorant is an organic dye. Organic dye classes include, by way of illustration only, triarylmethyl dyes, such as Malachite Green Carbinol base {4-(dimethylamino)-a-[4-(dimethylamino)phenyl]-a-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p-(dimethylamino)phenyl]phenylmethylium chloride}, and Malachite Green oxalate {N-4-[[4-(dimethylamino)-phenyl]-phenylmethylene]-2,5-cyclohexyldien-1-ylidene]-N-methyl-methanaminium chloride or bis[p-(dimethylamino)-phenyl]phenylmethylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis(dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH{6-amino-2-[(hydrazinocarbonyl)amino]-2,3-dihydro-1,3-dioxo-1H-benz[de]isoquinoline-5,8-disulfonic acid dilithium salt}; azine dyes, such as Janus Green B {3-(diethylamino)-7-[[4-(dimethylamino)phenyl]azo]-5-phenylphenazinium chloride}; cyanine dyes, such as Indocyanine Green {Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methyl-coumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxy-benzene diazonium chloride, zinc chloride double salt); phenylenediamine dyes, such as Disperse Yellow 9 [N-(2, 4-dinitrophenyl)-1,4-phenylenediamine or Solvent Orange 53]; diazo dyes, such as Disperse Orange 13 [Solvent Orange 52; 1-phenylazo-4-(4-hydroxyphenylazo) naphthalene]; anthra-quinone dyes, such as Disperse Blue 3 [Celliton Fast Blue FFR; 1-methylamino-4-(2-hydroxyethylamino)-9,10-anthraquinone], Disperse Blue 14 [Celliton Fast Blue B; 1,4-bis(methylamino)-9,10-anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]-6-sulfo-1-naphthalenyl)-azo]-1-naphthalenyl)azo]-1,5-naphthalenedisulfonic acid tetrasodium salt}; xanthene dyes, such as 2,7-dichloro-fluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1) -[29H,31H-phthalocyanato(2-)-$N^{29}$, $N^{30},N^{31},N^{32}$]copper}; carotenoid dyes, such as trans-β-carotene (Food Orange 5); carminic acid dyes, such as Carmine, the aluminum or calcium-aluminum lake of carminic acid (7-a-D-glucopyranosyl-9,10-dihydro-3,5,6,8-tetrahydroxy-1-methyl-9,10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt]and Acriflavine (Acriflavine neutral; 3,6-diamino-10-methylacridinium chloride mixture with 3,6-acridine-diamine).

The colorant compositions of the present invention may contain a number of additional components depending on the desired properties of the resulting composition. To improve lightfastness, one or more colorant stabilizers may be added to the composition. In one embodiment of the present invention, a colorant stabilizer in the form of a porphine is added to the colorant composition. Suitable porphines include, but are not limited to, porphines such as those disclosed in U.S. Pat. No. 5,782,963 and U.S. patent applications Ser. Nos. 08/788,863 now U.S. Pat. No. 6,099, 628 and 08/843,410, now U.S. Pat. No. 5,855,655 all of which are assigned to Kimberly Clark Worldwide, Inc.

In addition to the colorant and optional colorant stabilizer, the colored compositions of the present invention may contain additional components, depending upon the application for which it is intended. Examples of such additional components include, but are not limited to, buffering agents; charge carriers; stabilizers against thermal oxidation; viscoelastic properties modifiers; cross-linking agents; plasticizers; charge control additives such as a quaternary ammonium salt; flow control additives such as hydrophobic silica, zinc stearate, calcium stearate, lithium stearate, polyvinylstearate, and polyethylene powders; fillers such as calcium carbonate, clay and talc; surfactants; chelating agents; and TINUVIN® compounds; among other additives used by those having ordinary skill in the art. Charge carriers are well known to those having ordinary skill in the art and typically are polymer-coated metal particles. Desirable surfactants include, but are not limited to, $C_{12}$ to $C_{18}$ surfactants such as cetyl trimethyl ammonium chloride and carboxymethylamylose. TINUVIN® compounds are a class of compounds produced by Ciba-Geigy Corporation, which includes benzophenones, benzotriazoles and hindered amines. Desirable TINUVIN® compounds include, but are not limited to, 2-(2'-hydroxy-3'-sec-butyl-5'-tert-butylphenyl)-benzo-triazole, poly-(N-β-hydroxyethyl-2,2,6,6-tetramethyl-4-hydroxy-piperidyl succinate and 2-(2'-hydroxy-3',5'-ditertbutylphenyl)-5-chloro-benzotriazole. The identities and amounts of such additional components in the colored composition are well known to one of ordinary skill in the art.

Suitable solvents include, but are not limited to, amides, such as N,N-dimethylformamide; sulfoxides, such as dimethylsulfoxide; ketones, such as acetone, methyl ethyl ketone, and methyl butyl ketone; aliphatic and aromatic hydrocarbons, such as hexane, octane, benzene, toluene, and the xylenes; esters, such as ethyl acetate; water; and the like. Desirably, the solvent is water.

The present invention is also directed to ink-receiving substrates having the above-described composition thereon. The substrates to which the colorant and water-soluble compounds are applied include, but are not limited to, paper, wood, a wood product or composite, woven fabric, nonwoven fabric, textile, plastic, glass, metal, or any other substrate that would benefit from having a colorant thereon. Examples of suitable substrates are disclosed in U.S. patent application Ser. No. 08/843,410, now U.S. Pat. No. 5,855,655 assigned to Kimberly Clark Worldwide, Inc., the entire content of which is hereby incorporated by reference.

The present invention is also directed to a method of making a composition comprising a colorant and at least one water-soluble compound as described above. At least one water-soluble compound is incorporated into a mixture containing a colorant. The method of combining the colorant and water-soluble compound may be any method known to those of ordinary skill in the art.

The present invention is also directed to an ink jet ink cartridge containing the above-described composition.

The present invention is further directed to a method of printing an ink composition onto an ink-receiving substrate. In one method of printing of the present invention, an ink composition comprising a colorant and at least one water-soluble compound is ejected from an ink jet head onto an ink-receiving surface.

The present invention is further described by the examples which follow. Such examples, however, are not to be construed as limiting in any way either the spirit or the scope of the present invention. In the examples, all parts are by weight, unless stated otherwise.

EXAMPLE 1

Preparation of Magenta Ink

A magenta ink was prepared using the following components, given in weight percent:

| | |
|---|---|
| DI Water | 82.76 |
| NaOH (0.5 N solution) | 4.00 |
| CuTPPS$_4$ | 0.50 |
| EDTA | 0.10 |
| EuNO$_3$ | 0.05 |
| N-methylpropionamide | 8.00 |
| GIV-GUARD ® DNX | 0.40 |
| (50 wt % solution) | |
| COBRATEC ® 99 | 0.10 |
| Reactive Red 187 | 2.89 |
| (27 wt % solution) | |
| Acid Red 52 | 1.20 |

The resulting ink composition was applied to an ink-receiving substrate as described in pending U.S. patent application Ser. No. 09/058,385, entitled "Improved Substrate and Colorant Stabilizers", assigned to Kimberly Clark Worldwide, Inc. The applied ink composition was free of haze and tackiness.

EXAMPLE 2

Preparation of Magenta Inks

Two additional magenta ink compositions were prepared using the same components as in Example 1 above except the amount of N-methylpropionamide was 6.0 and 10.0 weight percent respectively.

The resulting ink compositions were applied to ink-receiving substrates as in Example 1. The applied ink compositions were free of haze and tackiness.

EXAMPLE 3

Preparation of Cyan Ink

A cyan ink was prepared using the following components, given in weight percent:

| | |
|---|---|
| DI Water | 69.80 |
| NaOH (0.5 N solution) | 3.20 |
| N-methylpropionamide | 8.00 |
| GIV-GUARD ® DNX | 0.40 |
| (50 wt % solution) | |
| COBRATEC ® 99 | 0.10 |
| Project Cyan | 18.50 |

The resulting ink composition was applied to an ink-receiving substrate as in Example 1. The applied ink composition was free of haze and tackiness.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A composition containing a colorant; at least one water-soluble compound having the following general formula:

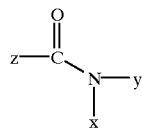

wherein x is hydrogen or an alkyl having from 1 to 6 carbons, y is an alkyl having from 1 to 6 carbons, and z is an alkyl having from 1 to 6 carbons; and a colorant stabilizer wherein the colorant stabilizer comprises a porphine.

2. The composition of claim 1, wherein the composition is an ink jet ink composition.

3. The composition of claim 2, wherein the water-soluble compound is present in an amount of up to about 25 weight percent based on the total weight of the composition.

4. The composition of claim 3, wherein the water-soluble compound is present in an amount of about 6 to 10 weight percent based on the total weight of the composition.

5. The composition of claim 3, wherein the composition comprises:

(a) from about 2 to about 25 weight percent of the water-soluble compound;

(b) from about 1 to about 10 weight percent colorant; and (c) the balance water.

6. The composition of claim 1, wherein the water-soluble compound comprises

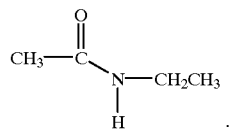

7. The composition of claim 1, wherein the water-soluble compound comprises

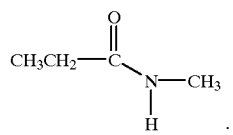

8. The composition of claim 1, further comprising at least one colorant stabilizer.

9. A substrate having the composition of claim 1 thereon.

10. A method of making a composition comprising:

combining a colorant, at least one water-soluble compound, and a colorant stabilizer; wherein the one water-soluble compound has the following general formula:

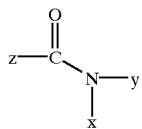

wherein x is hydrogen or an alkyl having from 1 to 6 carbons, y is an alkyl having from 1 to 6 carbons, and z is an alkyl having from 1 to 6 carbons; and wherein the colorant stabilizer comprises a porphine.

11. The method of claim 10, wherein the composition is an ink jet ink composition.

12. The method of claim 11, wherein the water-soluble compound is present in an amount of up to about 25 weight percent based on the total weight of the composition.

13. The method of claim 12, wherein the water-soluble compound is present in an amount of about 6 to 10 weight percent based on the total weight of the composition.

14. The method of claim 10, wherein the water-soluble compound comprises

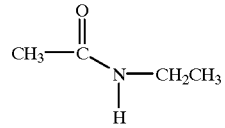

15. The method of claim 10, wherein the water-soluble compound comprises

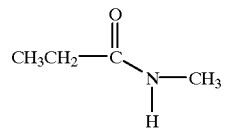

16. An ink jet ink cartridge containing the composition of claim 1.

17. A method of printing an ink composition onto a substrate comprising:

ejecting an ink composition from an ink jet cartridge onto a substrate; wherein the ink composition comprises a colorant; at least one water-soluble compound, wherein the one water-soluble compound has the following general formula:

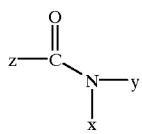

* * * * *